United States Patent Office 3,822,234
Patented July 2, 1974

3,822,234
VINYL CHLORIDE POLYMERS CONTAINING
ALKALI METAL ZINC FERROCYANIDES
Arthur W. McRowe, Akron, Ohio, assignor to The B. F.
Goodrich Company, New York, N.Y.
No Drawing. Filed Oct. 19, 1973, Ser. No. 407,865
Int. Cl. C08f 45/56
U.S. Cl. 260—45.75 R    7 Claims

ABSTRACT OF THE DISCLOSURE

Vinyl chloride polymers are compounded with alkali metal zinc ferrocyanides to provide improved flame resistance and reduce smoke production.

BACKGROUND OF THE INVENTION

Presently there is a pressing need for improved plastic products which are safer in fire situations, even for vinyl chloride polymers which generally are considered to be flame resistant. While rigid vinyl chloride products have many structural applications useful in buildings and transportation vehicles, many uses are also made of plasticized vinyl chloride polymers as in fabrics, upholstery, wall coverings and the like where flame resistance and smoke formation could be a problem. Government and Safety regulations relating to such materials are now in effect. Not only is flame resistance to be reduced in such materials as vinyl chloride plastic products, but smoke generated by vinyl chloride polymer products in fires also must be reduced. The NBS smoke chamber is accepted as a measure of smoke generated. While a number of materials have been proposed and used in vinyl chloride for this purpose, very few have been found to be completely satisfactory. Many are not compatible or readily mixed with vinyl chloride polymers, many are colored or form colored products in vinyl chloride polymer compositions and many have adverse effects on the physical properties of vinyl chloride polymers.

SUMMARY OF THE INVENTION

Alkali metal zinc ferrocyanides are very effective fire and smoke retardants in vinyl chloride polymer compositions even in low concentrations. The alkali metal zinc ferrocyanides are compatible and easily mixed with vinyl chloride polymers in both rigid and flexible forms, have low tinting power, do not form color products in vinyl chloride polymers and have no adverse effects on the physical properties or processing of compounds containing them.

DETAILED DESCRIPTION

The alkali metal zinc ferrocyanides have the genereal formula, wherein M is an alkali metal, of

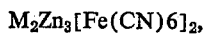

$$M_2Zn_3[Fe(CN)6]_2,$$

or hydrated containing 4 molecules of water. While any of the alkali metals may be used, preferred are the lithium, sodium and potassium salts. These materials are normally used in powder form in amounts greater than about 0.01 part per 100 weight parts of vinyl chloride polymer, more preferably from about 0.1 as 0.5 to about 5 to 10 weight parts per 100 weight parts of vinyl chloride polymer. From about 0.5 to about 2 weight parts is a very practical range providing a good balance of desirable properties in the compounds. The alkali metal zinc ferrocyanide such as sodium zinc ferrocyanide or potassium zinc ferrocyanide are readily mixed with the vinyl chloride polymers in powder form as is any other powder ingredient mixed with vinyl chloride polymers as is well known to those skilled in the art.

The vinyl chloride polymers include those vinyl chloride polymers that are homopolymers, that is, polyvinyl chloride, as well as those copolymers containing vinyl chloride and up to about 50%, more usually about 30% by weight of at least one other vinylidene monomer containing at least one terminal $CH_2=C<$ group such as vinylidene chloride, alkyl acrylates and methacrylates wherein the alkyl group contains 1 to 10 carbon atoms, acrylic acids, amides and nitriles thereof such as acrylic acid, ethacrylic acid, acrylamides, N-methylol methacrylamide, acrylonitrile, methacrylonitrile and the like, alpha-olefins containing 2 to 6 carbon atoms such as ethylene and propylene, vinyl esters such as vinyl acetate, vinyl butyrate, vinyl benzoate, vinyl aromatics such as styrene, chlorostyrene, ethyl styrene, vinyl naphthalene, vinyl alkyl ethers, vinyl ketones, chlorinated vinyl chloride polymers; and blends of vinyl chloride polymers with other polymers, both plastics and elastomers, for example, with ABS resins, wtih 10 to 40% of copolymers of styrene and acrylonitrile or styrene and methyl methacrylate wherein styrene is the major component, elastomers containing about equal amounts of styrene and acrylonitrile with butadiene, polyurethanes, nitrile elastomers, both liquid and solid, containing from about 15 to 40% acrylonitrile with the remainder butadiene, polyolefins and the like. These vinyl chloride polymers normally are high molecular weight polymers having a specific viscosity greater than 0.4 measured as a 0.4% solution in nitrobenzene.

The vinyl chloride polymers will be mixed with standard compounding ingredients known to those skilled in the art, plasticizers, lubricants, stabilizers, fillers, colorants, processing aids and the like. While these compounds are most effective in vinyl chloride polymers substantially free of plasticizers subject to burning, they provide improved compositions as to flame propagates and smoke when plasticizers are present.

In the following Examples, there is reported the oxygen index, OI, a $D'_{0.6}$ smoke number, and $D_m$ a maximum optical density observed with a vertical light path in the National Bureau of Smoke Chamber (NBS). The oxygen index is determined in accordance with ASTM D2863 test method and $D'_{0.6}$ smoke number measured when this apparatus is modified by the means described by Dipietro et.al., Journal of Flame and Flammability, Volume 2, Page 36, 1971, i.e., the optical density of the smoke generated when the sample is burning at the rate of 0.6 gram 1 minute. The NBS smoke chamber and its use are described by Gross et. al. in fire test methods ASTM STP 422, 1967, Pages 166–206. The NBS $D_m$ smoke numbers reported are in the flaming node.

EXAMPLE I

A vinyl chloride polymer compound was prepared by mixing 100 weight parts of polyvinyl chloride Geon 103EP with 2.0 weight part dibutyltindithioglycolate, 3.0 weight parts of polyethylene having a specific gravity of 0.924 g./cc. and melt index of 5 g./10 minutes, and the amounts of zinc ferrocyanide shown in the data table below. The ingredients were all dry blended, milled at 335° F. for 5 minutes, press molded at 350° F. for 5 minutes and cooled under pressure. 6 x 0.25 x 0.075 inch test samples were for the smoke-OI and 3 x 3 x 0.06 inch test samples for NBS. The following data were obtained.

TABLE I

| $K_2Zn_3[Fe(CN)_6]_2 \cdot 4H_2O$, wt. pts. | O.I. | Smoke—OI data | | | NBS smoke data | |
|---|---|---|---|---|---|---|
| | | $D'_{0.6}$ at— | Percent $O_2$ conc. | Percent smoke of control | $D_m$ (corr.) | Percent control |
| None | 44 | 450 | 49 | 100 | 640 | 100 |
| 0.5 phr | 56.5 | 180 | 64 | 40 | 321 | 50 |
| 1.0 phr | 61.3 | 133 | 69 | 30 | 335 | 52 |
| 5.0 phr | 69.8 | 60–90 | 78+ | 13–20 | 322 | 50 |

EXAMPLE II

To demonstrate that smoke formation is suppressed even when large amounts of liquid plasticizer are present in the vinyl chloride polymers, a series of compounds were made with 100 weight parts polyvinyl chloride Geon 103EP, 2.0 weight parts of the tin mercaptide stabilizer of Example I, 50 weight parts of diisooctyl phthalate plasticizer, dry mixed and milled for 5 minutes at 280 to 320° F., press molded for 2 minutes preheat, 5 minutes pressure at 220 to 330° F. and cooled under pressure.

TABLE III

| $K_2Zn_3[Fe(CN)_6]_2 \cdot 4H_2O$, added wt. pts. | Smoke-OI data | | NBS smoke data | |
|---|---|---|---|---|
| | $D'_{0.6}$ | Percent smoke of control | $D_m$ (corr.) | Percent of control |
| None | 1,044 | 100 | 401 | 100 |
| 2.0 phr | 589 | 56.4 | 258 | 64.2 |
| 5.0 phr | 589 | 56.4 | 311 | 77.6 |

The alkali metal zinc ferrocyanide is compatible with polyvinyl chloride, acting as a weak white low tinting pigment with no visible interreaction with any stabilizer systems tested in the vinyl chloride polymer compounds. At the preferred levels of use, zinc ferrocyanide is satisfactory in processing, handling and stability as was shown in Brabender studies with both plasticized and non-plasticized compounds. The alkali metal zinc ferrocyanides appear to have some lubricating properties. Oven aging studies at 485° F. with the polymer of Example I showed no premature darkening nor catastrophic failure.

EXAMPLE III

Another series of compounds using the receipe of Example I was made with sodium zinc ferrocyanide instead of the potassium compound as the flame and smoke retardant and tested in the same way as described. The following results were obtained.

TABLE IV.—RIGID PVC

| $Na_2Zn_3[Fe(CN)_6]_2 \cdot 4H_2O$, wt. parts | $D_m$/g. | Percent smoke reduction | OI |
|---|---|---|---|
| 0 | 60–61 | | 39.5 |
| 0.05 | 38–43 | 29–38 | 48.5 |
| 0.10 | 37 | 39 | 52.5 |
| 0.25 | 34–35 | 43–44 | 56.0 |
| 0.50 | 35–36 | 41–43 | 57.5 |
| 1.0 | 28–34 | 44–54 | 59.0 |

EXAMPLE IV

Another series of compounds were prepared using sodium zinc ferrocyanide and the basic receipe of Example I, plus 40 parts of diisooctyl phthalate and the fillers shown in the data table below. The reduction in smoke formation obtained with these compositions is clearly demonstrated in the data tables.

40 PARTS DOP

| Filler | $Na_2Zn_3[Fe(CN)_6]_2 \cdot 4H_2O$, parts | $D_m$/3.60 g. | Percent smoke reduction |
|---|---|---|---|
| None | 0 | 267 | |
| Do | 1 | 205 | 23 |
| Do | 3 | 185 | 31 |
| 50 pts. Al(OH)₃ | 0 | 204 | |
| 50 pts. Al(OH)₃ | 1 | 147 | 28 |
| 50 pts. Al(OH)₃ | 3 | 132 | 35 |
| 60 pts. CaCO₃ | 0 | 193 | |
| 60 pts. CaCO₃ | 1 | 102 | 45 |
| 60 pts. CaCO₃ | 3 | 109 | 47 |
| 80 pts. BaSO₄ | 0 | 187–191 | |
| 80 pts. BaSO₄ | 0.1 | 135–177 | 6–29 |
| 80 pts. BaSO₄ | 0.25 | 133–137 | 27–30 |
| 80 pts. BaSO₄ | 0.50 | 130–130 | 31–31 |
| 80 pts. BaSO₄ | 1.0 | 113–135 | 29–40 |
| 80 pts. BaSO₄ | 3.0 | 100–119 | 37–47 |

EXAMPLE V

Samples of a polymer blend of a polyblend of 50% polyvinyl chloride and 50% of low molecular weight butadiene-nitrile rubber containing about 28% acrylonitrile containing 0.5, 1.0 and 5.0 weight parts per 100 weight parts of polymer blend of potassium zinc ferrocyanide milled into the polymer blend at 125° F. where formed into test sheets pressed at 225° F. The oxygen index of the control was 21.8 and for the three compounds containing potassium zinc ferrocyanide 22.5, 25.5 and 25.5. The $D_m$/g. (maximum NBS smoke/sample weight) for these four samples including the control were respectively, 107, 92, 82 and 69.

I claim:

1. A composition comprising a vinyl chloride polymer and an alkali metal zinc ferrocyanide in an amount from about 0.01 to about 10 weight parts per 100 weight parts of vinyl chloride polymer.

2. The composition of Claim 1 wherein the vinyl chloride polymer is poly(vinyl chloride).

3. The composition of Claim 2 wherein the alkali metal zinc ferrocyanide is potassium zinc ferrocyanide.

4. The composition of Claim 2 wherein the alkali metal zinc ferrocyanide is sodium zinc ferrocyanide.

5. The composition of Claim 1 wherein the vinyl chloride polymer contains up to about 50% by weight of at least one vinylidene compound copolymerized therewith having a terminal $CH_2$=C< group.

6. The composition of Claim 5 wherein the alkali metal zinc ferrocyanide is potassium zinc ferrocyanide.

7. The composition of Claim 5 wherein the alkali metal zinc ferrocyanide is sodium zinc ferrocyanide.

References Cited

UNITED STATES PATENTS 3,766,157   10/1973   Parts et al. _____ 260—45.7

OTHER REFERENCES

Combustion and Flame: *14*, pp. 85 to 96; 1970; On the Mechanism of Flame Inhibition by Alkali Metal Salts, by Birchall.

V. P. HOKE, Primary Examiner